Feb. 19, 1952     P. K. RANNEY     2,585,963

APPARATUS FOR AND SYSTEM OF GASEOUS TUBE LIGHTING

Filed Feb. 5, 1945

INVENTOR.
PERCIVAL K. RANNEY
BY
Bates, Teare, & McKean
ATTORNEYS

Patented Feb. 19, 1952

2,585,963

UNITED STATES PATENT OFFICE 2,585,963

APPARATUS FOR AND SYSTEM OF GASEOUS TUBE LIGHTING

Percival K. Ranney, Lakewood, Ohio

Application February 5, 1945, Serial No. 576,251

2 Claims. (Cl. 315—278)

This invention relates to electrical apparatus, particularly to transformers that are used for controlling and operating gaseous tubes, such as fluorescent light sources.

In operating a system and apparatus which includes fluorescent light sources, particularly where a lagging current is used in one secondary circuit, and a leading current is used in another secondary circuit, the wave form of the current in the leading current circuit has been somewhat different from that in the lagging current circuit. An object of the present invention, therefore, is to provide apparatus by means of which the wave form of the current flowing in the various circuits is improved so as to increase the lumen output of the lamp.

A further object of the present invention is to make a transformer which utilizes a single primary and two secondary windings which are so arranged that each secondary is connected additively to the primary, but at opposite ends thereof. I have found that such arrangement has the effect of reducing the effective current flow in the primary, thereby enabling the use of a smaller sized wire in the primary than would otherwise be required.

Figure 1:
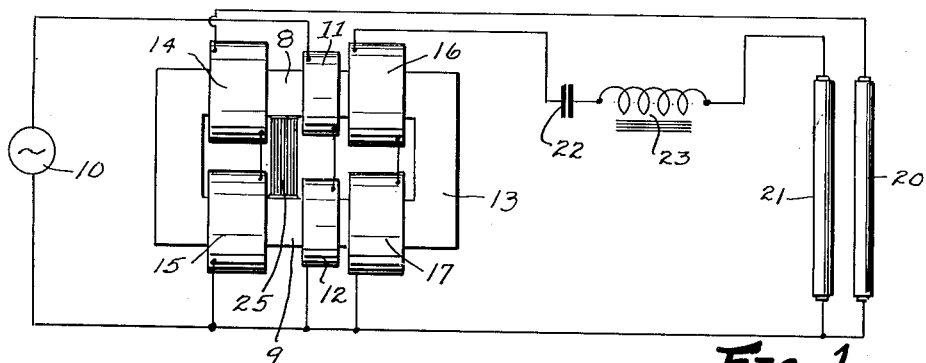
Figure 2:
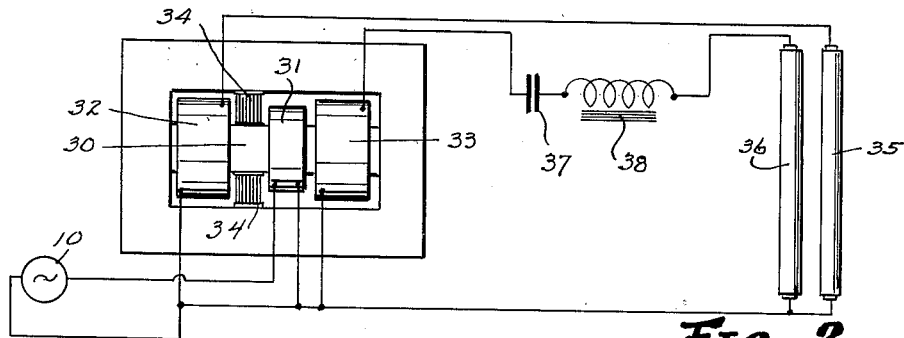
Figure 3:
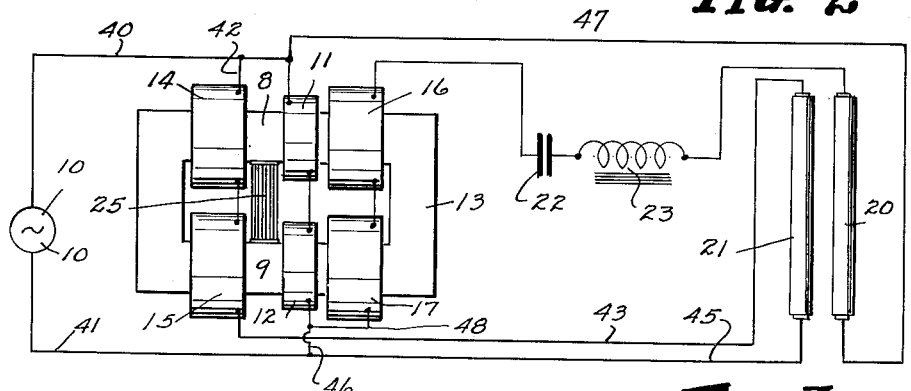

Referring now to the drawings, Fig. 1 shows a transformer and circuit assembly embodying the present invention; Fig. 2 shows a modified form of transformer construction; Fig. 3 shows a circuit assembly similar to Fig. 1, but having different wiring arrangements.

Considering the arrangement shown in Fig. 1, a source of current supply is indicated at 10 as energizing a primary winding represented by coils 11 and 12 on the opposing legs 8 and 9 of a transformer core 13. The transformer has a secondary winding represented by one set of coils 14 and 15, and another secondary winding comprising a set of coils 16 and 17, mounted on opposite sides of the primary coils 11 and 12 respectively. The coils 14 and 15 are connected in circuit with a gaseous tube 20, while the coils 16 and 17 are connected in circuit with a gaseous tube 21.

The circuit for the tube 21 has a condenser 22 and a choke coil 23 connected therein, and comprises the circuit which has the leading current therein. The lagging current in the circuit for the tube 20 is obtained by means of a shunt 25 in the core structure between the set of primary coils and the secondary coils 14 and 15.

An example of an apparatus for carrying out the invention illustrated in Fig. 1, may embody a source of alternating current supply at 118 volts and 60 cycles. The load circuit may comprise gaseous tubes, such as those designated as standard 40-watt fluorescent tubes. The transformer may have a core stack substantially 1" x 1" in cross section; each primary coil may have 250 turns of No. 22 wire; each secondary coil may have 1,000 turns of No. 26 wire, and the shunt 25 may have a size sufficient to limit the current to approximately 400 milliamperes on short circuit. The condenser 22 has a capacity of 1.75 microfarads, while the choke coil 23 has an inductance of .6 henries.

In the modification of Fig. 2, the transformer is of the shell type having a central leg 30 upon which the primary 31 and secondary windings 32 and 33 respectively are mounted. The primary winding is disposed between the two secondary windings, and there is interposed between the primary winding and the secondary winding 32 magnetic shunt means 34 in the core structure. The shunts effect a lagging current in the secondary circuit in which the coil 32 and gaseous tube 35 are connected. The circuit having the leading current therein is energized by the secondary coil 33. Such circuit includes the gaseous tube 36 connected therein and in addition includes the condenser 37 and a choke coil 38, the characteristics of which are the same as those of Fig. 1.

The modification of Fig. 3 shows the same arrangement of transformer, coils, core, shunt, condenser and choke coil as Fig. 1, hence, those parts which correspond have the same reference characters. In this modification, however, the circuit arrangements are such that each secondary is connected additively to the primary but at opposite ends thereof. Thus, if the voltage in the primary is 115 volts and that in each secondary is 335 volts, then the voltage across each tube would be 450 volts.

The circuit diagram for Fig. 3 illustrates a source of power at 10 and primary leads 40 and 41. Assuming that the point of zero voltage for the tube 21 is at the end connected to conductor 45 and lead 41, then, as to such tube circuit, current flows through the conductor 46 into the primary coil 12 through primary coil 11 to primary lead 40, thence through conductor 42, secondary coils 14 and 15, conductor 43, tube 21 and back to the primary lead 41 through the conductor 45. Thus, the tube voltage is the sum of the voltages of the primary and secondary windings which, for the example given, would be 450 volts.

Similarly, assuming that the point of zero voltage for the tube 20 is at the end of the tube connected to conductor 47 and lead 40, then for such tube circuit, current would flow through the primary coils 11 and 12, conductor 48, secondary coils 17 and 16, condenser 22, choke coil 23, tube 20 and back to the lead 40 through conductor 47. Thus, the voltage across the tube 20 is the sum of the voltages of the primary and secondary windings which, as aforesaid in the instance given, would be 450 volts.

I have found that an important advantage of the present invention is the fact that the use of a choke coil in addition to a condenser in the tube circuit having the leading current therein, has resulted in a wave form of the current in the leading circuit that is more nearly conformable to that in the lagging circuit, as a result of which the lumen output of the tubes is increased. Moreover, by arranging the circuits in the manner illustrated, I have been able to obtain a sufficiently high secondary voltage to start the tubes without the need for special starting apparatus and I have been able to utilize a smaller size of wire for the primary winding.

I claim:

1. An illuminating system comprising in combination, a transformer having a magnetic core, a primary winding and two secondary windings mounted on said core, a source of alternating current power connected across the primary winding, the primary winding being disposed between the secondary windings, magnetic shunt means disposed between the primary winding and one of the the secondary windings to the exclusion of the other secondary winding, a gas discharge tube in circuit with the secondary winding adjacent the shunt means, a second gas discharge tube in circuit with the other secondary winding, the last-mentioned circuit including a condenser and a choke coil connected in series, and each of said secondary windings being connected additively to the primary winding at opposite ends of the primary winding.

2. An illuminating system comprising in combination, a transformer having two secondary windings and a single primary winding disposed therebetween, a source of alternating power connected across the primary winding, magnetic shunt means disposed between the primary winding and one of the secondary windings to the exclusion of the other secondary winding, each secondary winding being connected additively to the primary winding at opposite ends of the primary winding respectively, a gaseous tube connected across said primary winding in series with the secondary winding associated with said magnetic shunt, a second gaseous tube connected across said primary winding in series with said other secondary winding, and a condenser and a choke coil connected in series between said last mentioned gaseous tube and secondary winding.

PERCIVAL K. RANNEY.

REFERENCES CITED

The following references are of record in the file of this patent:

UNITED STATES PATENTS

| Number | Name | Date |
| --- | --- | --- |
| 1,961,754 | Forney | June 5, 1934 |
| 2,025,471 | Osborne | Dec. 24, 1935 |
| 2,269,978 | Kronmiller | Jan. 13, 1942 |
| 2,298,935 | Freeman | Oct. 13, 1942 |
| 2,317,844 | Boucher et al. | Apr. 27, 1943 |
| 2,354,879 | Ranney | Aug. 1, 1944 |
| 2,358,810 | Karash | Sept. 26, 1944 |
| 2,370,635 | Bridges | Mar. 6, 1945 |